US007318076B2

(12) United States Patent
Chen et al.

(10) Patent No.: US 7,318,076 B2
(45) Date of Patent: Jan. 8, 2008

(54) MEMORY-RESIDENT DATABASE MANAGEMENT SYSTEM AND IMPLEMENTATION THEREOF

(75) Inventors: Tianlong Chen, Gaithersburg, MD (US); Jonathan Vu, Fairfax, VA (US)

(73) Assignee: Intelitrac, Inc., Gaithersburg, MD (US)

( * ) Notice: Subject to any disclaimer, the term of this patent is extended or adjusted under 35 U.S.C. 154(b) by 0 days.

(21) Appl. No.: 10/347,678

(22) Filed: Jan. 22, 2003

(65) Prior Publication Data
US 2004/0143562 A1 Jul. 22, 2004

(51) Int. Cl.
*G06F 17/30* (2006.01)
(52) U.S. Cl. .............................. 707/204; 707/2; 707/7; 707/103 R; 711/3
(58) Field of Classification Search ................ 707/100, 707/200–202, 2, 3, 7, 103 R–103 Z, 204; 711/3, 6, 100, 104, 105
See application file for complete search history.

(56) References Cited

U.S. PATENT DOCUMENTS

| 5,237,661 | A | * | 8/1993 | Kawamura et al. ........... 710/52 |
| 5,745,905 | A | * | 4/1998 | Larsson et al. ............. 707/203 |
| 5,809,495 | A | * | 9/1998 | Loaiza ......................... 707/2 |
| 5,913,219 | A | * | 6/1999 | Baek et al. ................. 707/202 |
| 6,105,024 | A | * | 8/2000 | Graefe et al. ................... 707/7 |
| 6,199,141 | B1 | * | 3/2001 | Weinreb et al. ............. 711/118 |
| 6,304,867 | B1 | * | 10/2001 | Schmidt ........................ 707/2 |

OTHER PUBLICATIONS

TimesTen Performance Software White Paper, "Architected for Real-Time Data Management—TimesTen's Core In-Memory Database Technology," TimeTen Performance Software 2001, pp. 1-14.

\* cited by examiner

*Primary Examiner*—John Cottingham
*Assistant Examiner*—Cheryl Lewis
(74) *Attorney, Agent, or Firm*—24IP Law Group; Timothy R. DeWitt

(57) ABSTRACT

A comprehensive Memory-Resident Database Management System architecture and implementation is disclosed where a) all data storage in database is in memory, b) all database management functionality is in memory except backup and recovery storage based on hard disk, c) all database objects including tables, views, triggers, procedures, functions . . . are in memory, d) all data security is at memory level, e) all data indexed, sorted and searched based on the selected search algorithms are in memory, f) all logging functionality to refresh in-between transactions reside in memory. Therefore, the processing speed of database query will take advantage of speed of RAM (Random Access Memory) without sacrifice any speed losing on Hard disk I/O. Not only the whole database is running in RAM, but also all or pre-selected database table columns are default to be indexed. All internal processing of database query is based on indexed columns.

3 Claims, 17 Drawing Sheets

MEMORY-RESIDENT DATABASE MANAGEMENT SYSTEM AND IMPLEMENTATION THEREOF

CROSS-REFERENCE TO RELATED APPLICATIONS

Distributed Memory Computing Environment and Implementation Thereof; Filed Jan. 22, 2003; Ser. No. 10/347,677 Inventors: Tianlong Chen, Jonathan Vu, Yingbin Wang.

STATEMENT REGARDING FEDERALLY SPONSORED RESEARCH OR DEVELOPMENT

Not Applicable.

BACKGROUND OF THE INVENTION

1. Field of the Invention

The present invention is related to Relational Database Management Systems (RBMS) and more particularly to a Memory-Resident Database Management System (MRDBMS) and its implementation.

2. Description of the Related Art

Most conventional Relational Database Management Systems store data in hard disk based files or file systems, and load data from the hard disk into RAM (Random Access Memory) when necessary. However, hard disk I/O is normally much slower than I/O in RAM. The present invention is to reduce hard disk I/Os for substantially all operations in a database. In a preferred embodiment, the hard disk use is limited to initialization, backup and recovery operations.

SUMMARY OF THE INVENTION

The present invention disclosed and claimed herein is a method and system for an Memory-Resident Database Management System.

In still another aspect of the disclosed embodiment, a method of Memory Management for any process within a server to access large amount of RAM is disclosed.

In still another aspect of the disclosed embodiment, a method of extending Memory beyond the limitations imposed by most operating systems. This method may be used, for example to download Gigabytes or Terabytes of data from a legacy system into memory.

In still another aspect of the disclosed embodiment, a method of Messaging System architecture used between the memory user processes and memory holding processes is disclosed.

In still another aspect of the disclosed embodiment, a method of Mirror Backup and Recovery System architecture is disclosed.

In still another aspect of the disclosed embodiment, a method of creating database objects in memory including the following objects: a) tables, b) views, c) triggers, d) procedures, e) packages, f) functions, g) indexes, and h) synonyms.

In still another aspect of the disclosed embodiments, a method of creating a database engine completely in memory to include the parsing and execution of the SQL-92 compliant queries for Select, Update, Delete and Insert statements.

In still another aspect of the disclosed embodiment, a method of completing the transactions for mutating data completely in memory for all the Update, Delete and Insert statements, before and after "commit" and/or "rollback" statements.

In still another aspect of the disclosed embodiment, a method of bypassing the maximum data transfer per transaction basis.

In still another aspect of the disclosed embodiment, a method of data refresh for each transaction completely in memory conducted within the MRDBMS for recovery purpose from database crash. This method will include the activities to complete all in-between transactions.

Still other aspects, features, and advantages of the present invention are readily apparent from the following detailed description, simply by illustrating preferable embodiments and implementations. The present invention is also capable of other and different embodiments, and its several details can be modified in various respects, all without departing from the spirit and scope of the present invention.

Accordingly, the drawings and descriptions are to be regarded as illustration in nature, and not as restrictive.

BRIEF DESCRIPTION OF THE DRAWINGS

The accompanying drawings, which are incorporated in and constitute a part of this specification illustrate some embodiments of the invention and, together with the description, serve to explain some aspects, advantages, and principles of the invention. In the drawings.

DETAILED DESCRIPTION OF THE INVENTION

Figure 1:
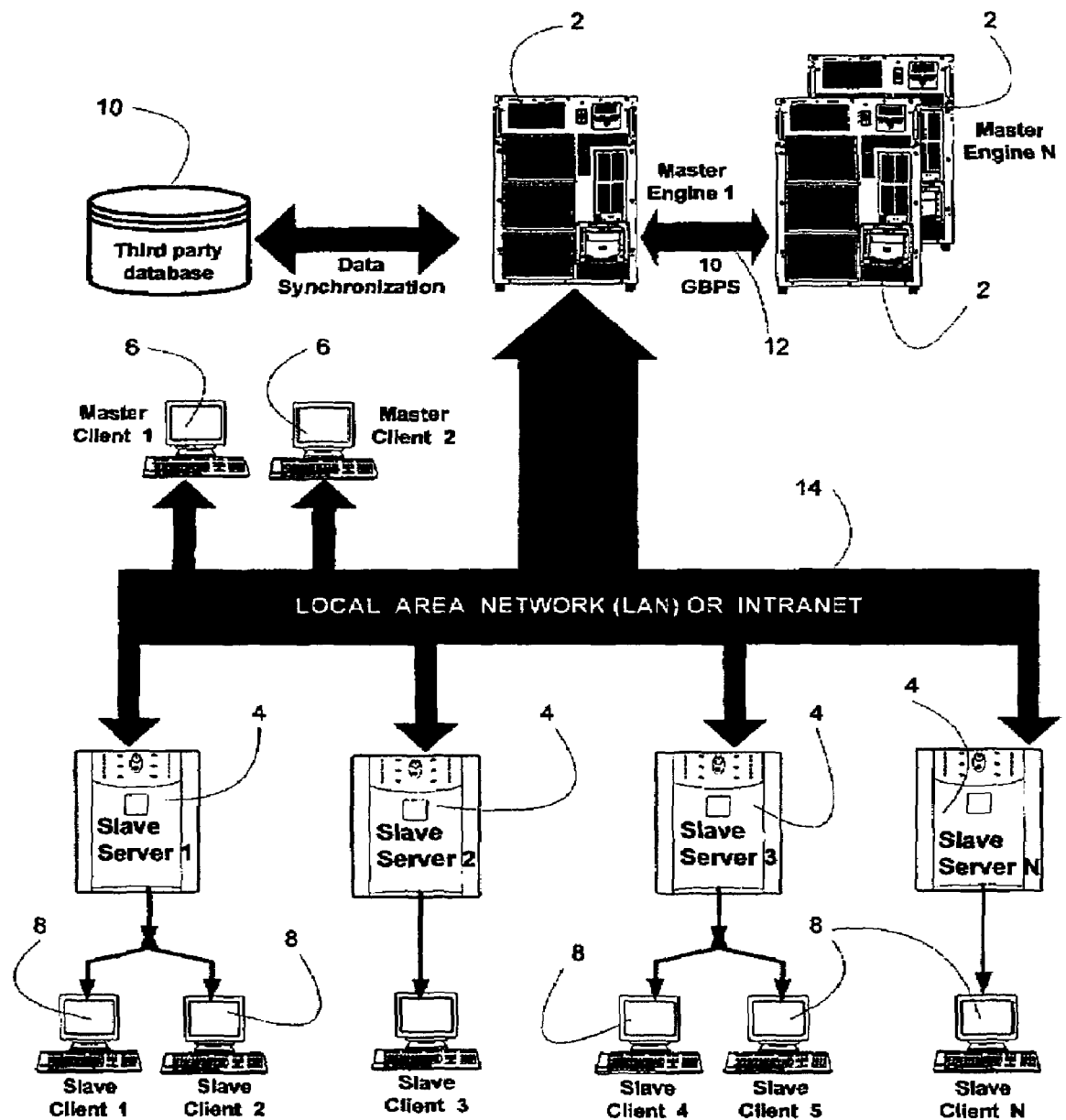
FIG. 1 illustrates a reference system physical architecture for use in illustrating an implementation of a Memory-Resident Database Management System of the present invention

FIG. 1 illustrates an example of the physical architecture of an environment in which the invention may be practiced. In this example, the environment has a plurality of master servers 2 connected to each other through a high-speed network such as a fiber-optic network 12 with an operating speed of 10 gigabits per second (Gbps). Although a plurality of master servers 2 are shown in this embodiment, the invention may be practiced in an environment with a single master server as well. The master servers or engines 2 are connected via a local area network (LAN) 14 or intranet to one or more slave servers or engines 4. The LAN may be, for example, an Ethernet network. The one or more master servers 2 may also be connected to one or more master clients 6 via the LAN or intranet 14. Each slave server 4 may further be connected to one or more slave clients 8. The master engine(s) or server(s) may further be connected to a third party database 10. This example environment shown in FIG. 1 is just one example, as it will be apparent to one of skill in the art from the following description that the present invention may be used in many different systems with widely varying physical architecture. Other embodiments of architectures in accordance with the present invention are described in related application Distributed Memory Computing Environment and Implementation Thereof; Filed Jan. 22, 2003; Inventors: Tianlong Chen, Jonathan Vu, Yingbin Wang, hereby incorporated by reference herein, in its entirety.

Figure 2:
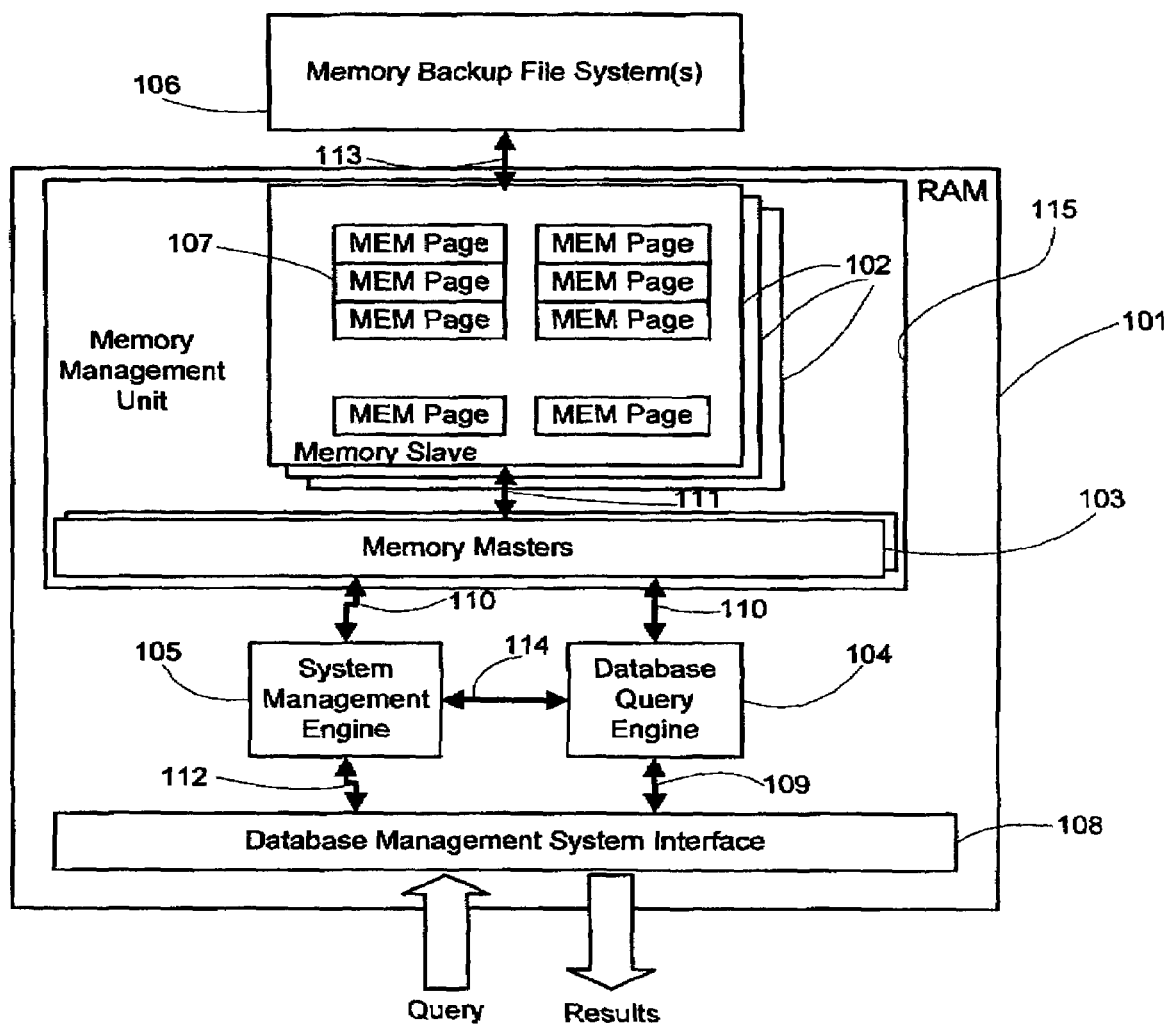
FIG. 2 illustrates a conceptual block diagram of an embodiment of the Memory-Resident Database Management System of the present invention.

Referring to FIG. 2, there is illustrated block diagram of Memory-Resident Database Management System (MRDBMS). The MRDBMS includes Database Management System Interface 108, Database Query Engine 104, System Management Engine 105, Memory Management Unit 115, and Memory Backup System 106. Users do management and database queries through the Interface 108. Database Query Engine 104 is responsible for handling standard SQL queries, whereas System Management Engine 105 is responsible for handling system management such as configuration and setup, access control and security, queries on statistical and performance status, maintenance, etc. The Memory Management Unit (MMU) 115 provides memory page and node pool management for the front Engines 104, 105. The MMU 115 and Memory Backup System 106 together provides backup and recovery functionality of MRDBMS.

Still referring to FIG. 2, the MMU 115 includes one or more Memory Master(s) 103 and one or more Memory Slaves 102, each Memory Slave 102 having a Memory Page Pool 107. Each Memory Slave 102 handles its own memory page backup to Memory Backup System 106 (see 113). Each Memory Slave 102 responds to Memory Master 103's request for any memory actions such as malloc, read, write and free (see 111).

In the example physical architecture shown in FIG. 1, the various components of the MRDBMS may reside in a wide variety of locations that would be readily apparent to those of skill in the art. For example, the database management system interface may be through the various master and slave clients 6 and 8. The database query engine 104, the system management engine may reside in one of the master servers or engines 2. Memory masters 103 may reside in master servers 2 or in slave servers 4. Memory slaves may reside in various master servers 2, slave servers 4, master clients 6, slave clients 8 or in other memories on the fiberoptic network or the LAN. The memory backup system likewise may be in any number of different forms, such as one or more hard disk drives.

Figure 3:
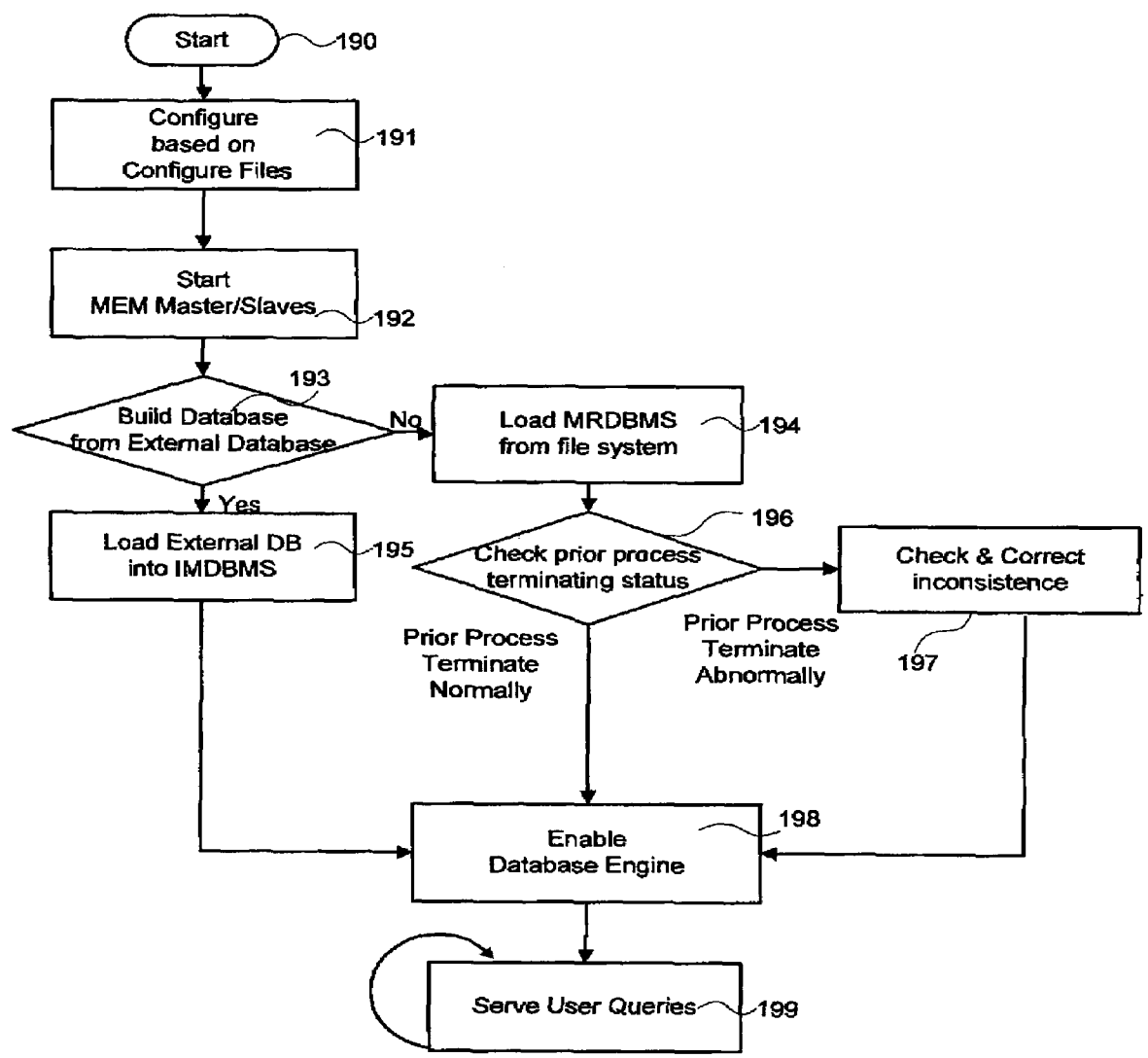
FIG. 3 illustrates a conceptual block diagram of high-level-view of data flow of the main process of an Memory-Resident Database Management System in an embodiment of the present invention.

Referring to FIG. 3, which illustrates a conceptual block diagram of the starting procedure of an MRDBMS daemon 190, the database daemon reads configuration file(s) for system preferred configuration 191, then starts Master/Slave based MMU 192. If loading external Database 193 is requested through either configuration files or Management Interface 108, then external-Database loader will be called to load the external database into MRDBMS 195. Otherwise, MRDBMS will be loaded 194 from Memory Backup System 106. If MRDBMS, then a checking procedure is started to check whether prior database daemon was terminated normally or abnormally 196. After MRDBMS is loaded with the database, if any, the Database Engines 104 and 105 are enabled 198 for serving user's queries 199.

Figure 4:
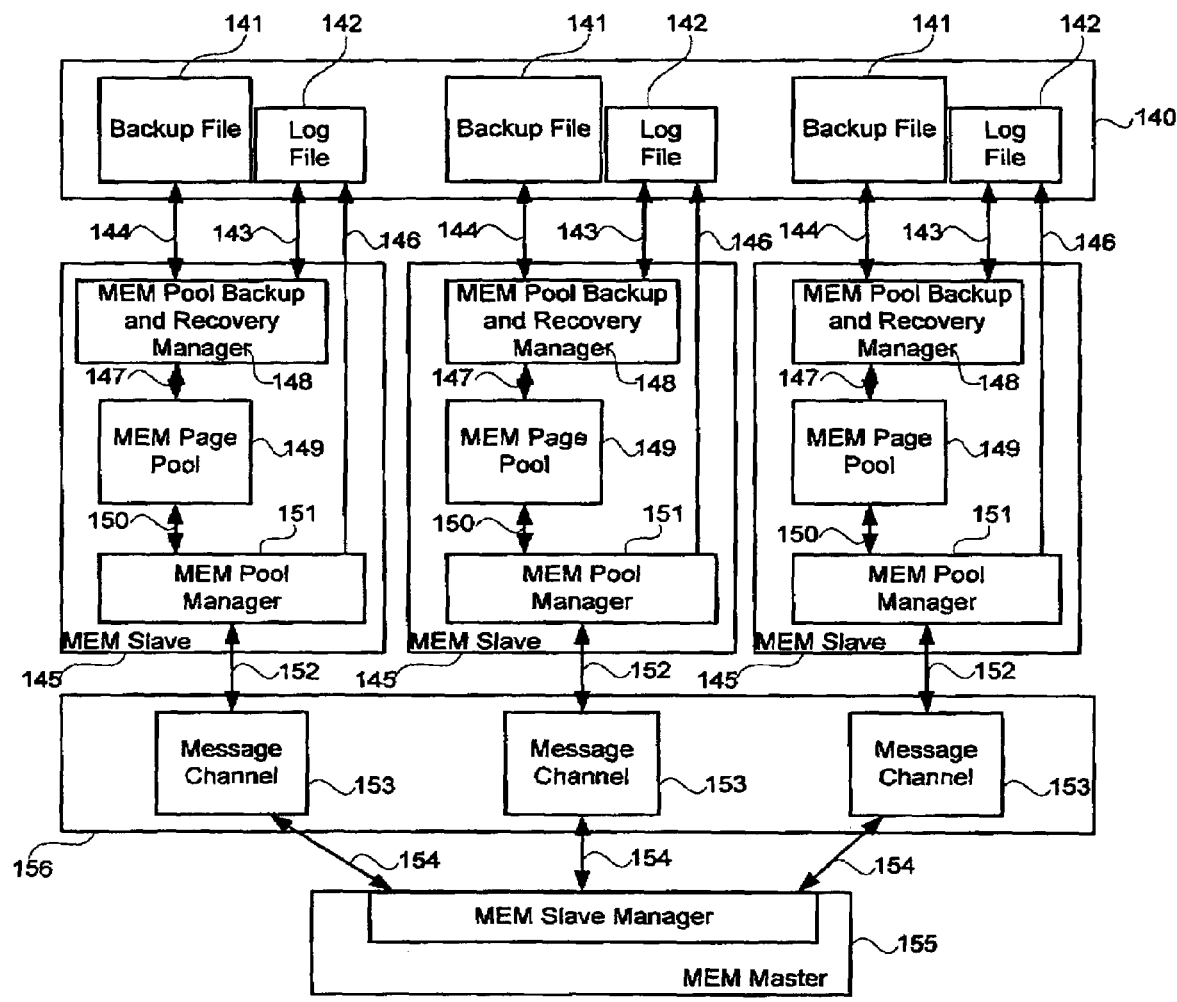
FIG. 4 illustrates a conceptual block diagram of a Memory Management Unit (MMU) system in an embodiment of the present invention.

Referring now to FIG. 4, there is illustrated a block diagram of an embodiment of Memory Management Unit architecture for providing extended virtual memory to calling processes and for reliable backup and recovery capability. The architecture main sections: Memory Master 103, Memory Slaves 102, Memory Information Exchange layer 156 and Memory Backup and Recovery (MBR) layer 140 which includes Memory Pool Backup and Recovery Manager 148, Backup file 141, Log file 142 and related logical links 143, 144 and 147.

Still referring to FIG. 4, the Memory Master 103 is an interface layer between memory users (called "callers") and memory holding process(es). It provides memory functions such as allocate memory, read from memory, write to memory, free memory, etc. to memory users. Such memory functions are transparent, meaning that the memory users do not know where memory is actually located. Besides the transparent memory functions, the Memory Master 103 initializes Memory Slaves 102, sets up Memory Information Exchange layer 156, and provides accessible functions to callers to configure, start and schedule the Memory Backup and Recovery functions 148 of Memory Slaves.

Still referring to FIG. 4, each Memory Slave 102 can be configured as either a daemon process outside the process that hosts Memory Master 103 (referred as "Memory Slave Daemon") or be configured as a functional layer within the process that hosts the Memory Master 103 (referred as "Memory Slave Function"). Normally the process that hosts a Memory Master 103 is also the main process. If Memory Slave 102 is configured as an outside daemon process, a communication Messaging Channel 153 between every Memory Slave 102 and every Memory Master 103 should be set up within the Memory Information Exchange (MIE) layer 156. If Memory Slaves 102 are set up within the same process that hosts Memory Master 103, the Memory Channel 153 in the MIE layer is simple and may be implemented as wrapper functions to access memories held by Memory Slaves 102. In this situation, Memory Masters 103 directly access the Memory Pages/Nodes in the Memory Slaves 102. Whereas in the Memory Slave Daemon scenario, Memory Masters 103 do not directly access Memory Pages/Nodes in the Memory Slaves 102.

In an embodiment of the invention for a 32-bit Operating System, the Memory Slave Daemon is a mandatory configuration for Memory Slave 102 in order for callers to be able to access more than 4 GB of memory and up to hundreds of Terabytes of memory. In an embodiment of the invention for a 64-bit Operating System, either the Memory Slave Daemon or the Memory Slave Function implementation provides capability to access more than 4 GB of memory and beyond hundreds of Terabytes of memory.

In both 32-bit and 64-bit operating system embodiments, an extended 64-bit address is used to address memories in order to provide maximum source code level compatibility across various 32-bit and 64-bit operating systems. In either case, the extended 64-bit address (for clear description, called ITC Virtual Address) includes three kinds of information: a native virtual memory address in a process (referred as the MEM Cell ID); a memory block address used to extend the memory boundary within a server (referred as the MEM Block ID); and a memory server address used to extend the memory boundary beyond a single server (referred as the MEM Server ID). The address lookup and implementation mechanism in 32-bit and 64-bit operating systems, however, is different.

Figure 5:
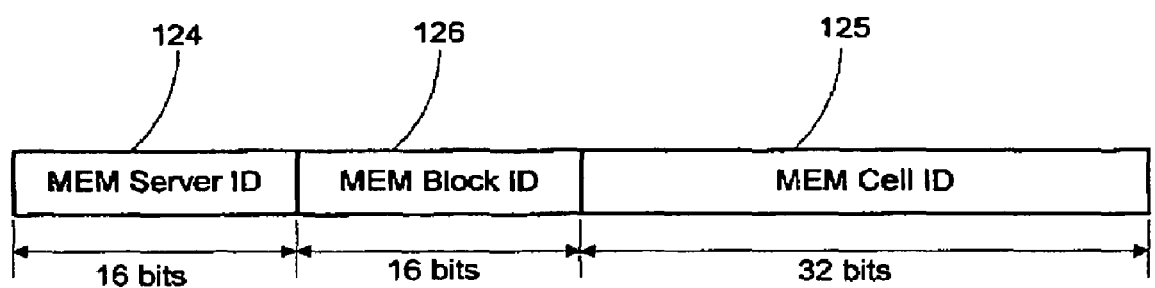
FIG. 5 illustrates a conceptual block diagram of an extended memory address in an embodiment of the invention for a 64-bit Operating System.

Referring to FIG. 5, which illustrates an embodiment of the invention in a 64-bit operating system, a memory address is natively 64-bits, as illustrated in Linux IA64 kernel or other operating systems. The low 40 bits 125 are used by the underlying operating system for a virtual address. In this embodiment, the MEM Cell ID is the low 40 bits 125. The server ID is embedded in the 12 bits 124. A mapping lookup table between Server ID and Server Information Entry (including server IP address, port, access control information) is kept within a Memory Master 103 to access distributed memory in network-linked servers. The MEM Block ID or Memory Slave Daemon index is embedded in the 12 bits 126. The number of bits in the MEM Cell ID, MEM Block ID, MEM Server ID may vary based on the operating system used.

Figure 6:
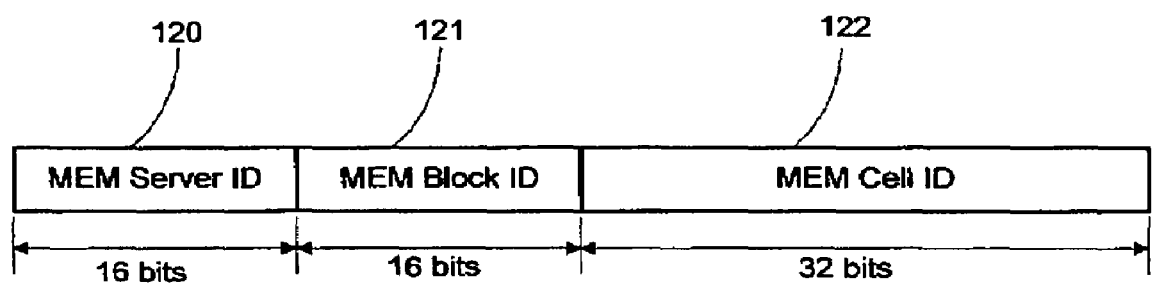
FIG. 6 illustrates a conceptual block diagram of an extended memory address in an embodiment of the invention for a 32-bit Operating System.

Referring to FIG. 6, which illustrates an embodiment in a 32-bit operating system, a native memory address is 32-bits as shown as the MEM Cell ID 122. The MEM Server ID, which is the server index if several servers are grouped together to form a distributed memory farm, uses the high 16 bits 120, and the MEM Block ID, which is the Memory Slave Daemon index, uses middle 16 bits 121.

Figure 7:
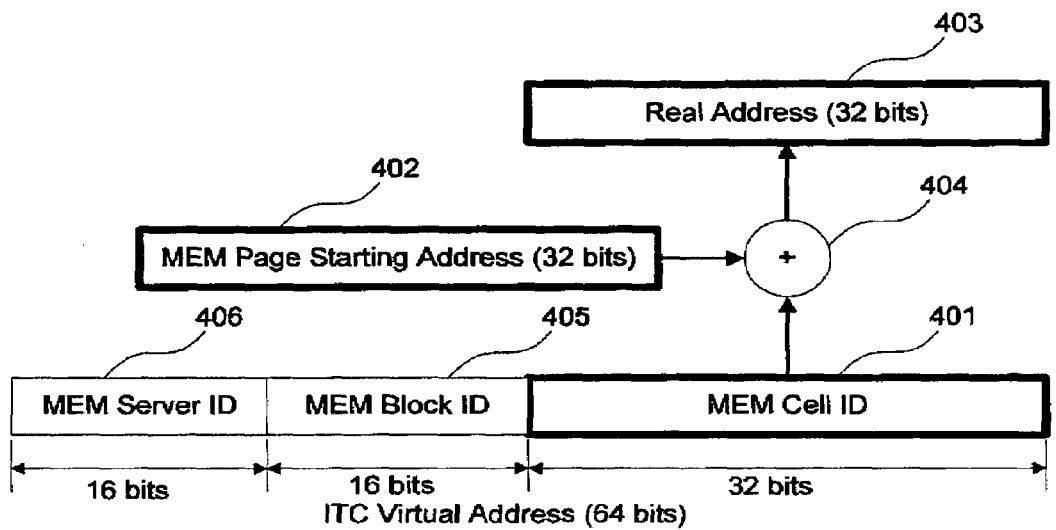
FIG. 7 illustrates a conceptual block diagram of how to use a 64-bit extended memory address (called "ITC Virtual Address") of an embodiment of the present invention to access the Real Address which is the virtual address provided by an underlying 32-bit Operating System.

Referring to FIG. 7, which illustrates how to use an ITC Virtual Address to address memory in a 32-bit Operating System, each Memory Slave 102 maintains the starting address 402 of the memory page array, and also the starting address of a linked list node array. Each such node is made from an array of same sized memory blocks. Both linked list nodes and memory pages are the basic units to form the Memory Page Pool. The MEM Cell ID 401 in the ITC Virtual Address is not an actual address but an offset from the above starting addresses. Therefore, the Real Address 403 that can be used to access the memory space is calculated by the sum 404 of the starting address 402 and the offset stored in MEM Cell ID 401. Note the starting address of the memory page and starting address of the linked-list-node blocks are different and should be treated separately.

The reason for the above memory address arrangement is clear when the Memory Backup System is considered. The address used in any process is not the actual physical address but the virtual address. It would be useless if the address maintained in Memory Backup System were the virtual address. By maintaining memory offset, the Memory Backup System can rebuild data storage in MRDBMS without any problem. The similar treatment is provided in the embodiment for the 64-bit Operating system embodiment as illustrated in FIG. 8.

Figure 8:
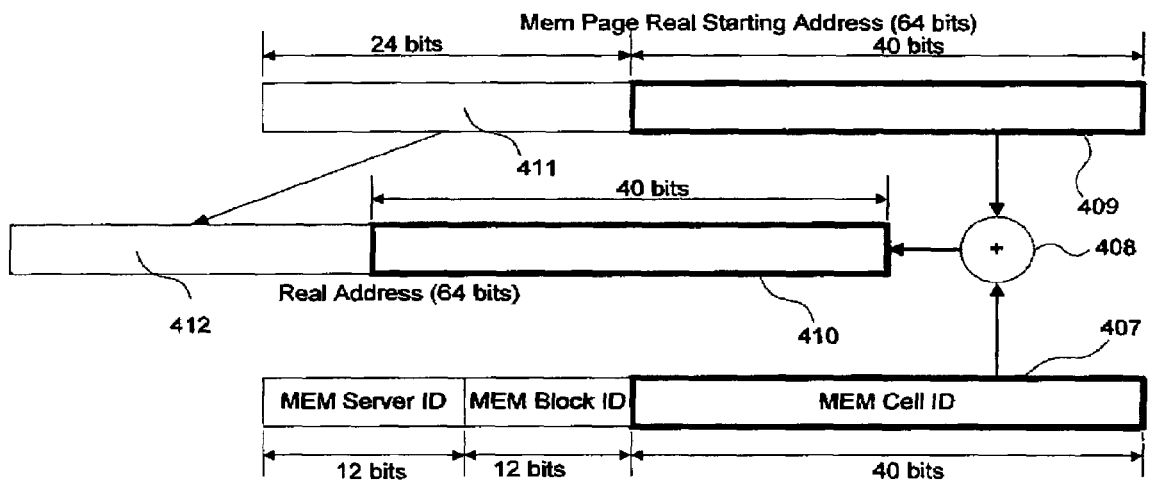
FIG. 8 illustrates a conceptual block diagram of how to use a 64-bit extended memory address (called "ITC Virtual Address") of an embodiment of the present invention to access the Real Address which is the virtual address provided by an underlying 64-bit Operating System.

FIG. 8 illustrates how to use ITC Virtual Address to address memory in a 64-bit Operating System. Similar to the 32-bit situation, the sum 408 of the offset from 40-bit MEM Cell ID 407 and the 40-bit 410 of a starting address form the low 40-bit of the real address 409, the high 24-bit of real address 412 comes from the high 24-bit of the associated starting address 411 as illustrated in FIG. 8.

Referring to FIG. 4, each Memory Slave 102 constructs its own memory into a pool of basic memory units of memory pages (called MEM Pages) and smaller memory units or memory nodes (called MEM Nodes). MEM Pages and MEM nodes are the main constructing components of the Memory Page Pool 149.

Figure 9:
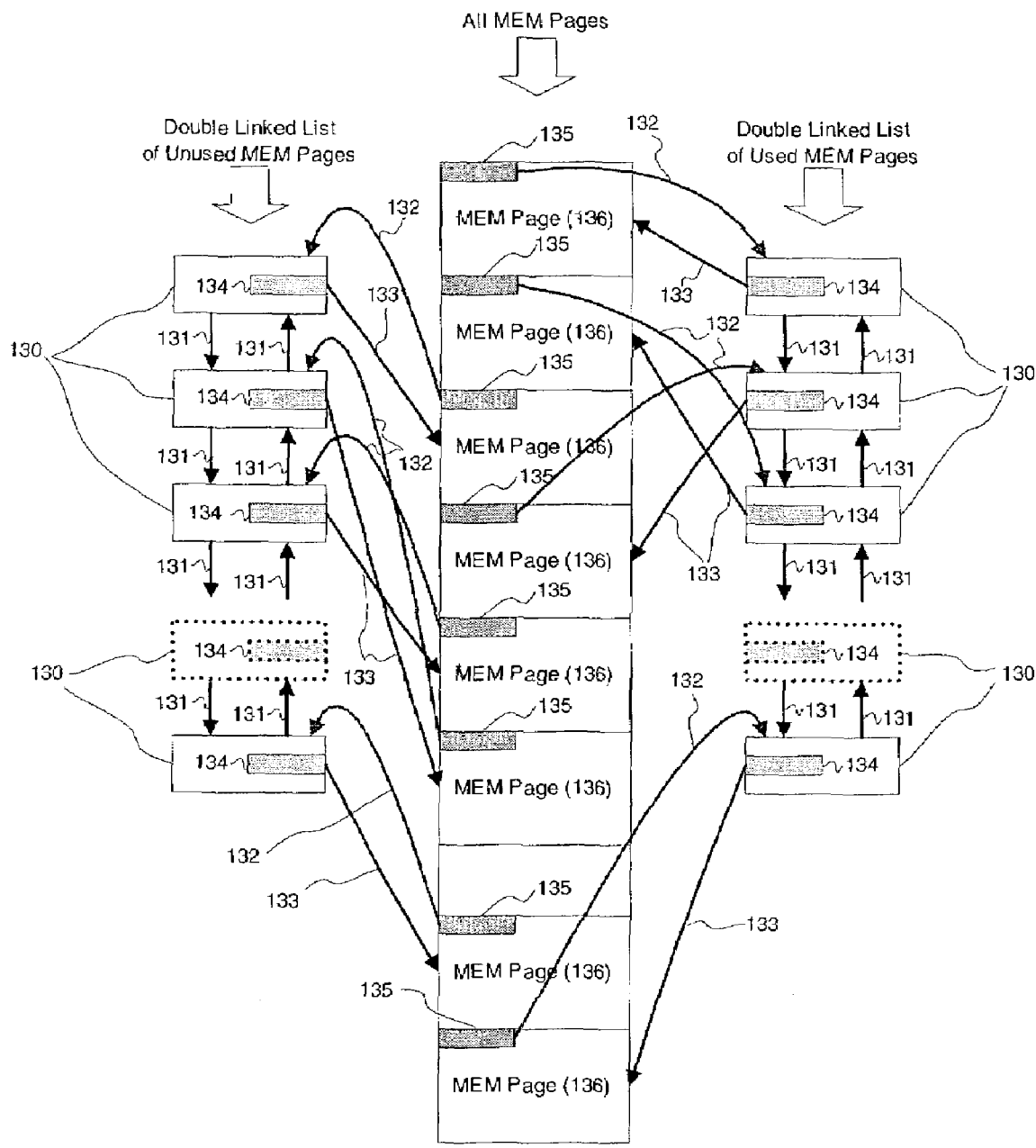
FIG. 9 illustrates a conceptual block diagram of Memory Page Pool management in an embodiment of the present invention.

Referring to FIG. 9, the initialization of the Memory Slave 102 (Daemon or Function) is based on the given configurable parameters including total memory size per Memory Slave 102, MEM Page size, and MEM Node size. Memory Slave 102 can calculate the number of MEM Pages in the Memory Slave 102. Memory Slave 102 will allocate all memory of the targeted total memory size, separate this huge memory buffer into an array of contiguous MEM Pages 136, and an array of double-linked-list-node blocks 130. The starting addresses of the two memory arrays are maintained, as they are used in memory lookup and memory backup as disclosed in above paragraphs.

Still referring to FIG. 9, after the creation of contiguous MEM Page array, four double linked lists are created to link MEM Pages and MEM Nodes separately and make MEM Pages and MEM Nodes handling fast and easy. The two of four double linked lists are used to handle MEM Pages, and the other two are used to handle MEM Nodes. Among the two double linked lists for MEM Pages, one double linked list links all "Unused" MEM Pages, the other links all "Used" MEM Pages. Similarly, a double linked list links all "Used" MEM Nodes, the other links "Unused" MEM Nodes. There are the same number of double-linked-list nodes 130 as the MEM Pages are allocated, and each of the double linked list nodes has one pointer 134 to point to one MEM Page 136, as depicted by arrow 133. At the same time, the first 64-bits 135 of the MEM Page 136 keep the address 132 of its 'parent' double linked list node 130. Such bi-directional pointers give bi-directional referring capability. When MEM Pages 136 are allocated by Memory Slave 145 on behalf of Memory Master 155, these MEM Pages 136 are moved from "Unused" list to "Used" list, whereas when MEM Pages 136 are "freed" by Memory Slave on behalf of Memory Master, the related MEM Pages are moved from the "Used" list to the "Unused" list. The same occurs with respect to the MEM Nodes.

Still referring to FIG. 9, MEM Nodes are handled as the same way as MEM Pages 136.

Referring to FIG. 4, the Memory Page Pool 149 includes the above contiguous MEM Page buffer herein the MEM Pages and MEM Nodes, and the four double linked lists (see FIG. 9 too). The Memory Page Pool includes both memory page (called MEM Page or MEM Page) and memory node (called MEM Node or MEM Node) management. A memory page is the basic memory unit of Memory Management with normally1024, 2048 or 8192 bytes in each memory page, whereas a memory node is made from a memory page and is of a smaller size than a memory page.

Figure 10:
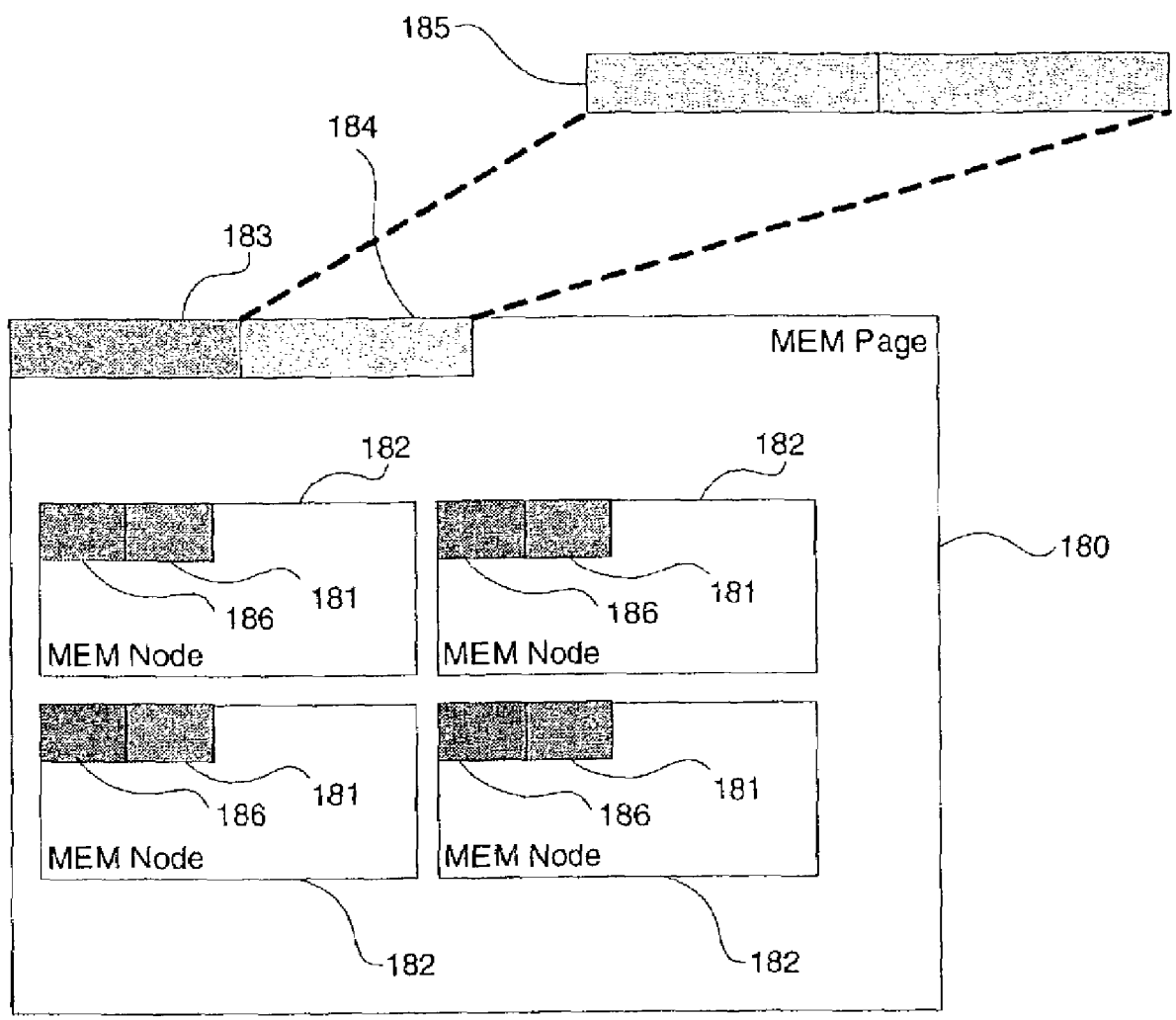
FIG. 10 illustrates a conceptual block diagram of how memory nodes are made from memory page in an embodiment of the present invention.

Referring to FIG. 10, the MEM Nodes 182 are made from MEM Pages 180, they tend to be used for memory usage requiring smaller size than MEM Pages 180. In FIG. 10, 183 refers to the same 64-bit address 135 in FIG. 9.

Still referring to FIG. 10, the second 64-bit address space 184 is separated into two parts as shown in 185, the high 32-bits keep the number of MEM Nodes 182 in this MEM Page 180 and the low 32-bit keeps the number of "free" MEM Nodes in this MEM Page. When the number of "free" MEM Nodes is equal to the number of MEM Nodes in the MEM Page, this MEM Page 180 can be freed, meaning that the MEM Page is valid to be moved from the "Used" list to the "Unused" list.

Still referring to FIG. 10, each MEM Node 182 has its first 64-bit address space 186 to point to its parent double linked list node as similarly shown in FIG. 9, and it has its second 64-bit address space 181 to point to the MEM Page 180 from which the MEM Node 182 is made.

Referring to FIG. 4, when Memory Slaves are configured as daemon processes outside the process that hosts the Memory Master 103, the Memory Information Exchange (MIE) layer 156 is needed for communication between Memory Master 103 and Memory Slave 102.

Figure 11:
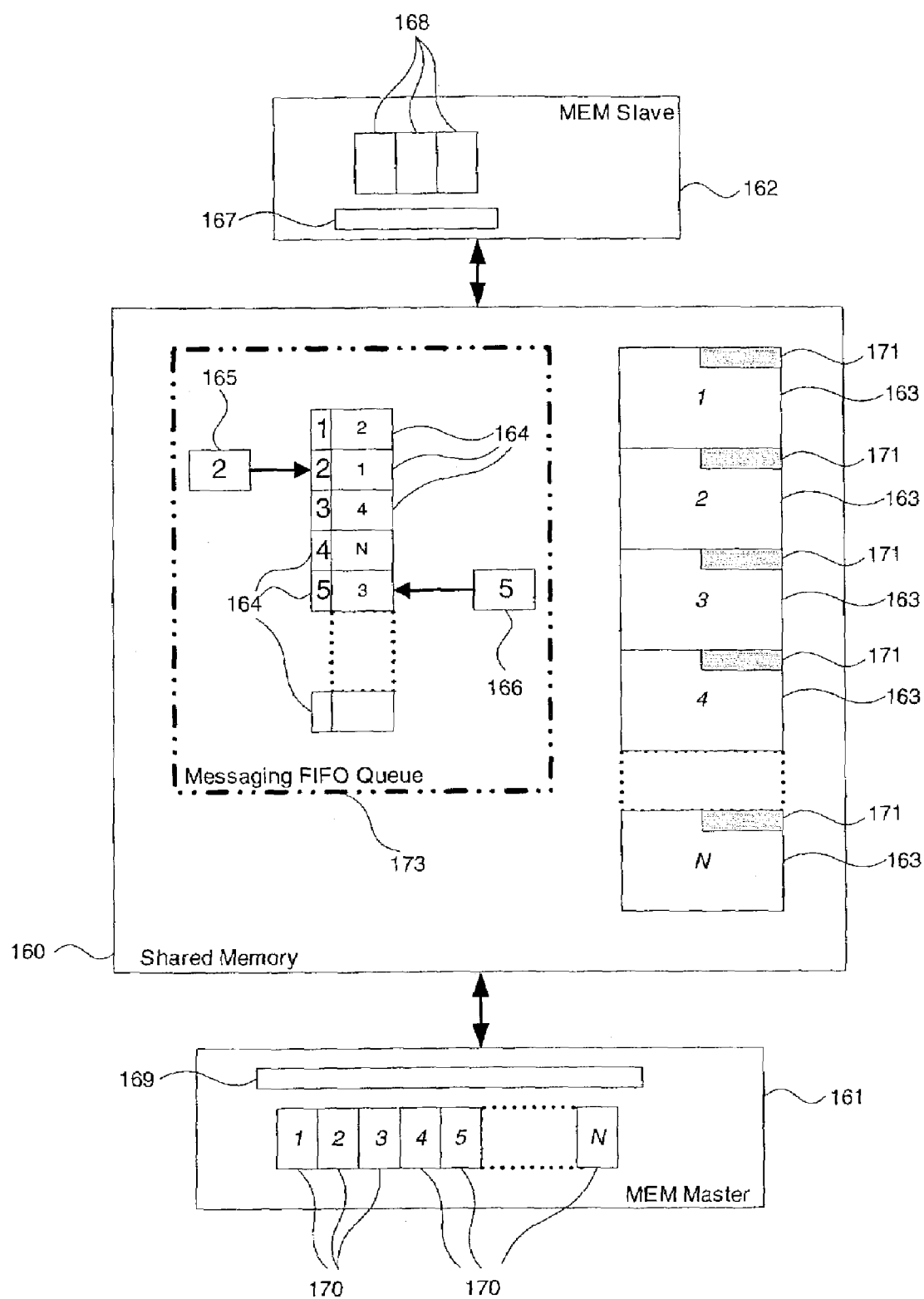
FIG. 11 illustrates a conceptual block diagram of a Memory Information Exchange (MIE) layer by using shared-memory-based messaging architecture in an embodiment of the present invention.

Referring to FIG. 11, a shared-memory based Messaging Channel in the Memory Information Exchange layer is illustrated. Such MIE layer is used to exchange inter-process information between memory user processes and memory holding processes.

When MEM Slaves are configured as Daemon processes, MIE layer is a layer for Slaves and Masters to exchange memory page/node information and other information such as statistical status etc., and Master cannot directly access memory pages/nodes in Slaves. When MEM Slaves are configured as Function, MIE layer is thin transparent layer that MEM Masters can directly access the memory pages/nodes in Slaves. MIE layer can be implemented in numerous ways. In this disclosed embodiment of MIE, a shared-memory-based messaging architecture for MIE is a preferred way. The Messaging Channel 160 includes a Memory First-In-First-Out (FIFO) Queue and an array of Indexed Memory Messaging Blocks.

One Messaging Channel 160 is needed between every Memory Master and every Memory Slave. The process hosting the Memory Master 161 is multithread 170. Of course the process could be a single thread too, which is just one special case. Each thread 170 is indexed by an integer. Each thread is part of the database system interface to customers, processing database queries and other queries. In the process of a database query, it may make a memory action request, through the Memory Master, to allocate memory pages/nodes, read memory pages/nodes, write memory pages/nodes, or free memory pages/nodes. When Memory Slaves are configured as separate daemon processes, each Memory Slave daemon will have its own Messaging Channel to communicate with Memory Master in another process.

Still referring to FIG. 11, in order to make communication fast, and make it possible for large volume data transfer back and forth between Memory Master 161 and Memory Slave 162, a shared-memory messaging channel embodiment as preferable communication method is implemented. Other methods can do this satisfactorily as well.

Still referring to FIG. 11, in the shared-memory messaging system, each thread 170 in the process-hosting Memory Master 161 will have its own Messaging Block 163, in which the memory space 171 will be used as flag to indicate messaging block status. One Messaging FIFO (First-In-First-Out) Queue (MFQ) 173 is used to indicate which thread 170 sends a message first and which later. Memory Slave 162 will read from this queue 164 to know which messaging block 163 should be processed next.

Still referring to FIG. 11, Messaging FIFO Queue (MFQ) 164 can be implemented as a circular array if the maximum number of queue nodes is known, or can be implemented as a linked list if unknown. A preferable embodiment of the MFQ 164 is a circular integer array with the number of integers greater or equal to the maximum number of threads that could communicate with Slave. At the beginning, all integers in the circular array are initiated as −1 as invalid index.

Figure 12:
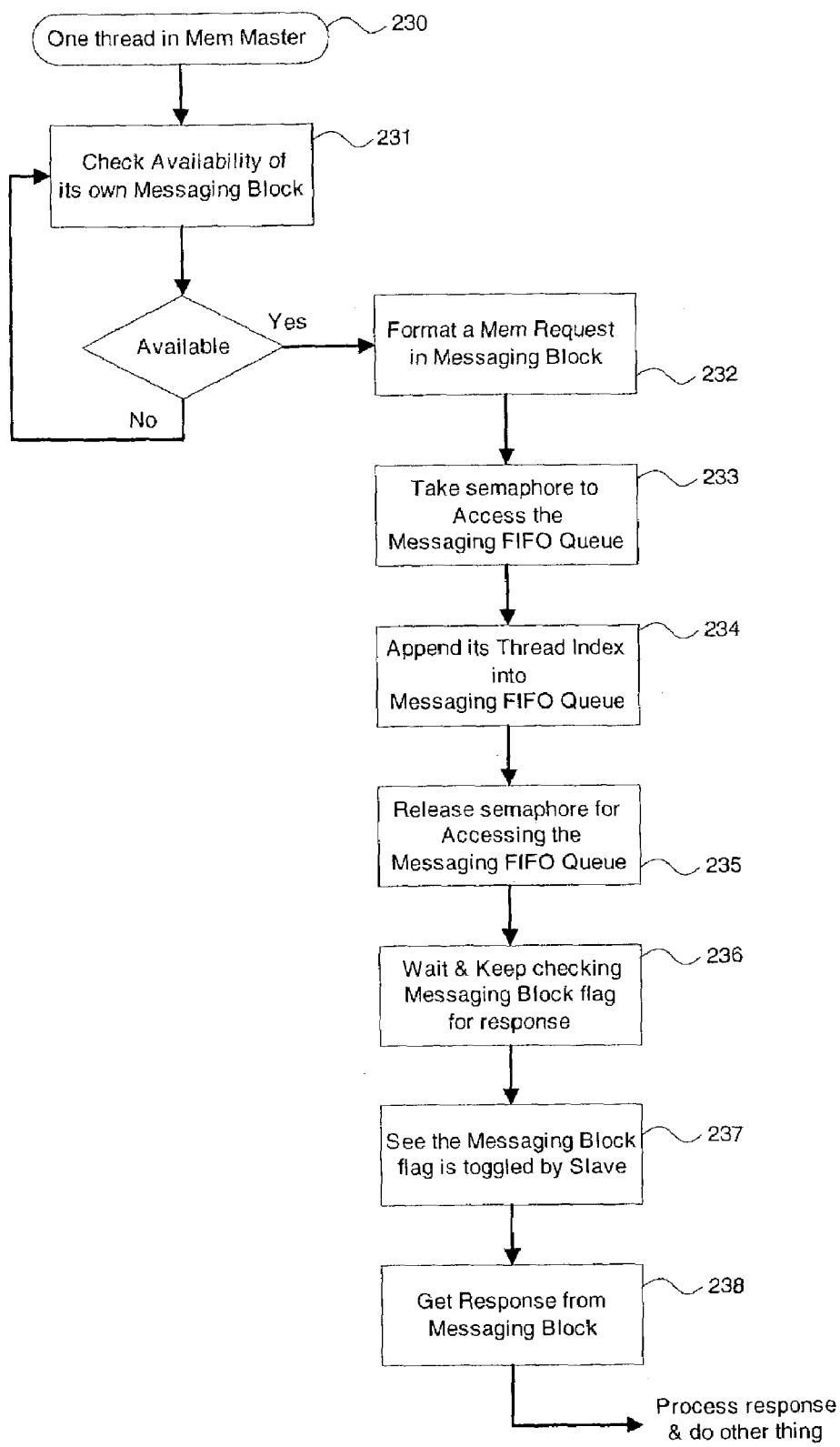
FIG. 12 illustrates a conceptual data flow block diagram of how one thread in a Memory Master uses an MIE layer to exchange information with Memory Slave in an embodiment of the present invention.

Referring to FIG. 11 and FIG. 12, when one thread in the Memory Master 103 requests a memory action (malloc, read, write and free or status)(step 230), it first checks the flag 171 in its own messaging block whether its own messaging block is available for memory action (step 231). It is normally available. Then the thread writes its request to the messaging block 163 based on pre-defined Memory Messaging Protocol and reset the flag 171 (step 232). Then take a mutex semaphore 169 in Memory Master process (step 233), put its index into the MFQ 164 (step 234), move the master-side pointer 166 to the next one, then release the mutex semaphore 169 (step 235). Such processing procedures are illustrated as dataflow block diagram in FIG. 12.

Figure 13:
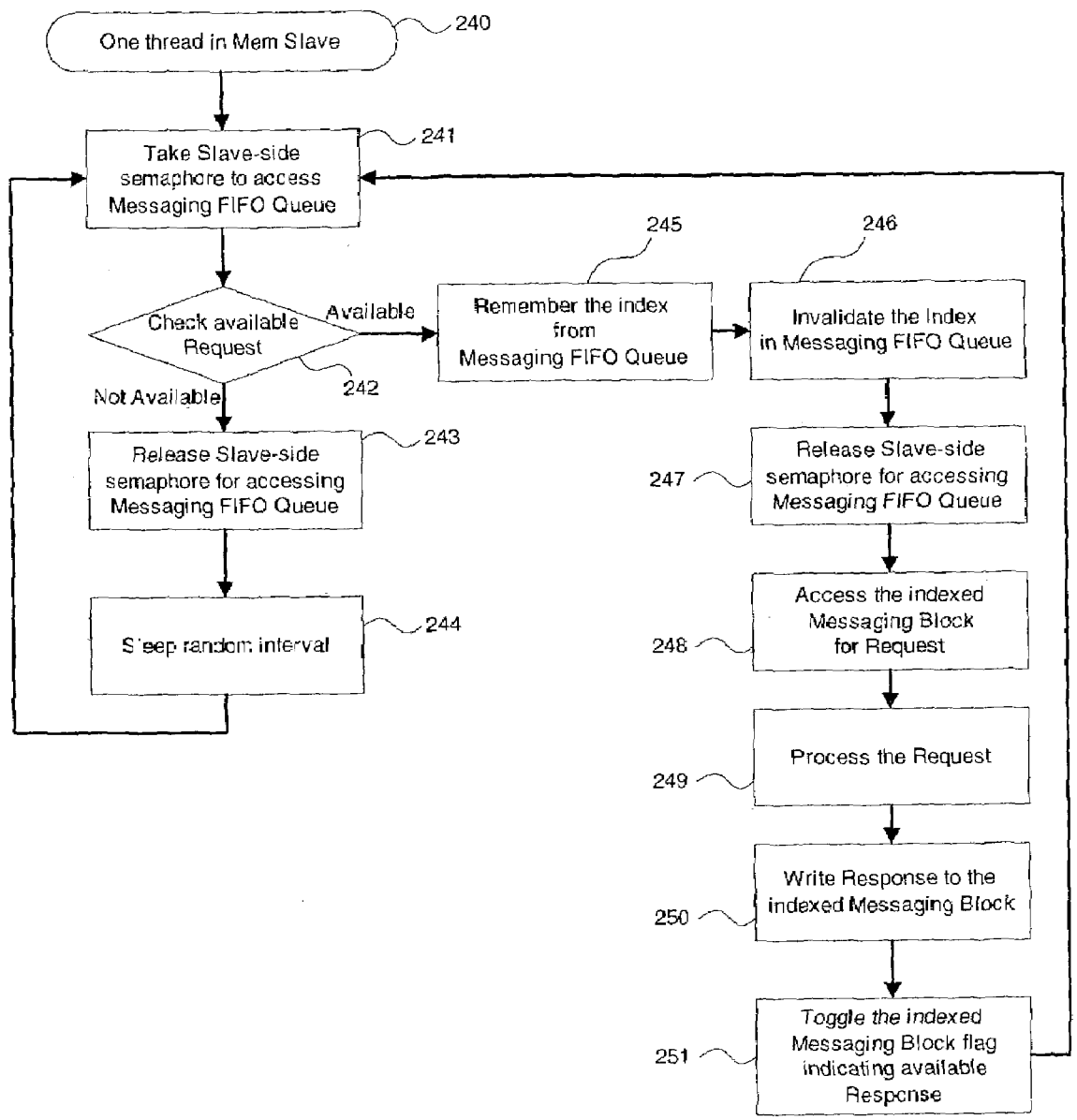
FIG. 13 illustrates a conceptual data flow block diagram of how one thread in a Memory Slave uses an MIE layer to exchange information with Memory Master in an embodiment of the present invention.

Referring to FIG. 11 and FIG. 13, one thread 168 in Memory Slave 102 takes a mutex semaphore 167 (step 241), and checks whether the index pointed by Slave-side pointer 165 is valid (step 242). If the index is valid, Mem Slave copies the value into thread own local variable (step 245), and reset the index to invalid value of −1 (step 246), then move the Slave-side pointer 165 to next one, then release the mutex semaphore 167 (step 247). Then the thread 168 goes ahead to access the messaging block (step 248) and process the memory request (step 249). After processing, the thread 168 puts the response results into the Messaging Block 163 (step 250) whose index matches the index 165 that the thread gets from the MFQ 164, then toggles the flag 171 in that Messaging Block 163 to indicate that a response is available (step 251).

Referring again to FIG. 11 and FIG. 12, the thread 170 in Memory Master process keeps checking the flag 171 of its own messaging block 163 for available response (step 236). When the thread 170 sees the response flag 171, it then resets the flag 171 (step 237), and processes the response (step 238). Such procedure is illustrated as dataflow diagram in FIG. 12.

From memory users (callers) point of view, the following memory related functions are necessarily important: (1) memory allocation ("malloc" function), (2) read from memory ("read" function), (3) write to memory ("write" function), and (4) free memory ("free" function). The following paragraphs illustrate such functions in pseudo code. They are all to be used within the process hosting the Memory Master 103 in FIG. 4.

The "malloc" function, for which two kinds of memory units can be requested, one for memory pages, which normally are of 1024, 2048 or 8196 bytes and the size is configurable, the other is for memory nodes, which normally are of smaller size and are made from portions of memory pages. The required pass-in parameters are "desired number of memory pages" or "desired number of memory nodes". The "returned" is a list or array of memory pages or memory nodes.

Figure 14:
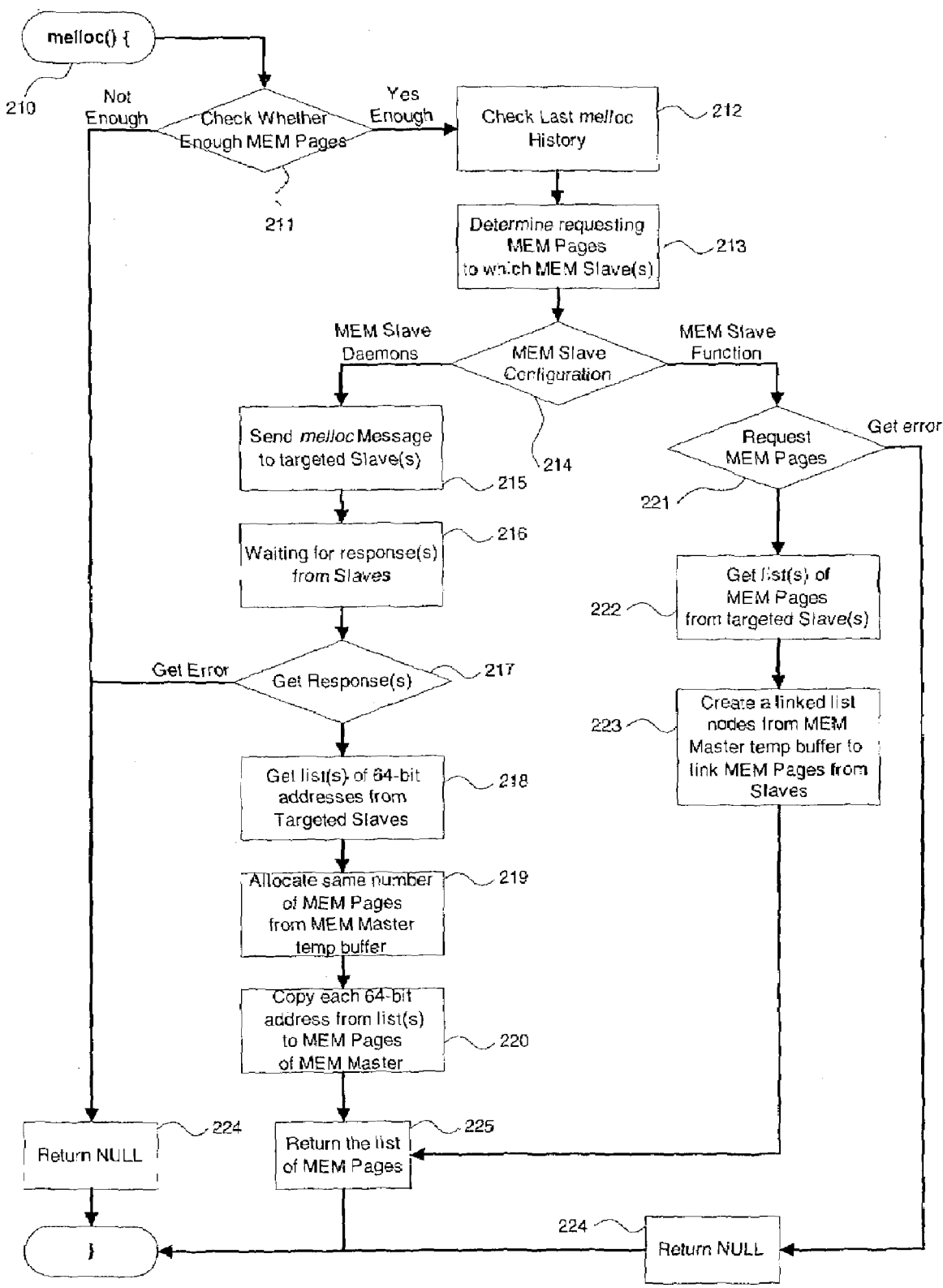
FIG. 14 illustrates a conceptual data flow block diagram of how a memory allocation function malloc( ) allocates Memory Pages using a Memory Management Unit (MMU) in an embodiment of the present invention.

Referring to FIG. 14, which illustrates a dataflow block diagram of "malloc" function using the present MMU. The following is a pseudo code of malloc:

```
malloc(the desired number of MEM Pages/Nodes)
{
    Check whether there are enough memory pages 211, if not, return
NULL 224;
    Based on memory allocation history 212, choose next one or
several Memory Slaves to request memory pages 213;
    If Memory Slave 145 is configured as Daemon 214, then
    {
        Send message through Messaging Channel 153 requesting
the desired number of MEM Pages/Nodes 215;
        Waiting on Messaging Channel for response (see FIG. 11
above and related explanation below) 216;
            Get response from Messaging Channel 153 (217) or timeout;
            If the response is error from Memory Slave or timeout, then
            {
                Return NULL 224;
            }
            If the response is a list of MEM Page/Node 64-bit addresses
(which is referred as 135 in FIG. 9) 218, then
            {
                Allocate the same number of memory pages/nodes in a
linked list or array from Memory Master's own temporary buffers 219;
                For each MEM Page/Node, copy the 64-bit address got
from the response from the Messaging Channel to the same corresponding
place in the pages/nodes allocated from Memory Master's temporary
buffer 220.
                Return the resulting list (or array) of MEM Pages/Nodes
(from the Memory Master temporary buffer) 225;
            }
    }
    214 If Memory Slave is configured as Function, then
    {
        Request the desired number of MEM Pages/Nodes from
Memory Slave 221;
        Memory Slave returns native for error or a list of MEM
Pages/Nodes 223;
        If Memory Slave returns error, then
        {
            Return NULL 224;
        }
        If Memory Slave returns a list of MEM Pages/Nodes, then
        {
            Return the list of MEM Pages/Nodes 222;
        }
    }
}
```

The "read" function, takes a pointer to a list of 64-bit addresses and the number of addresses in the list as two parameters, returns a list of the corresponding MEM Pages/Nodes with the corresponding addresses or empty list if error.

Figure 15:
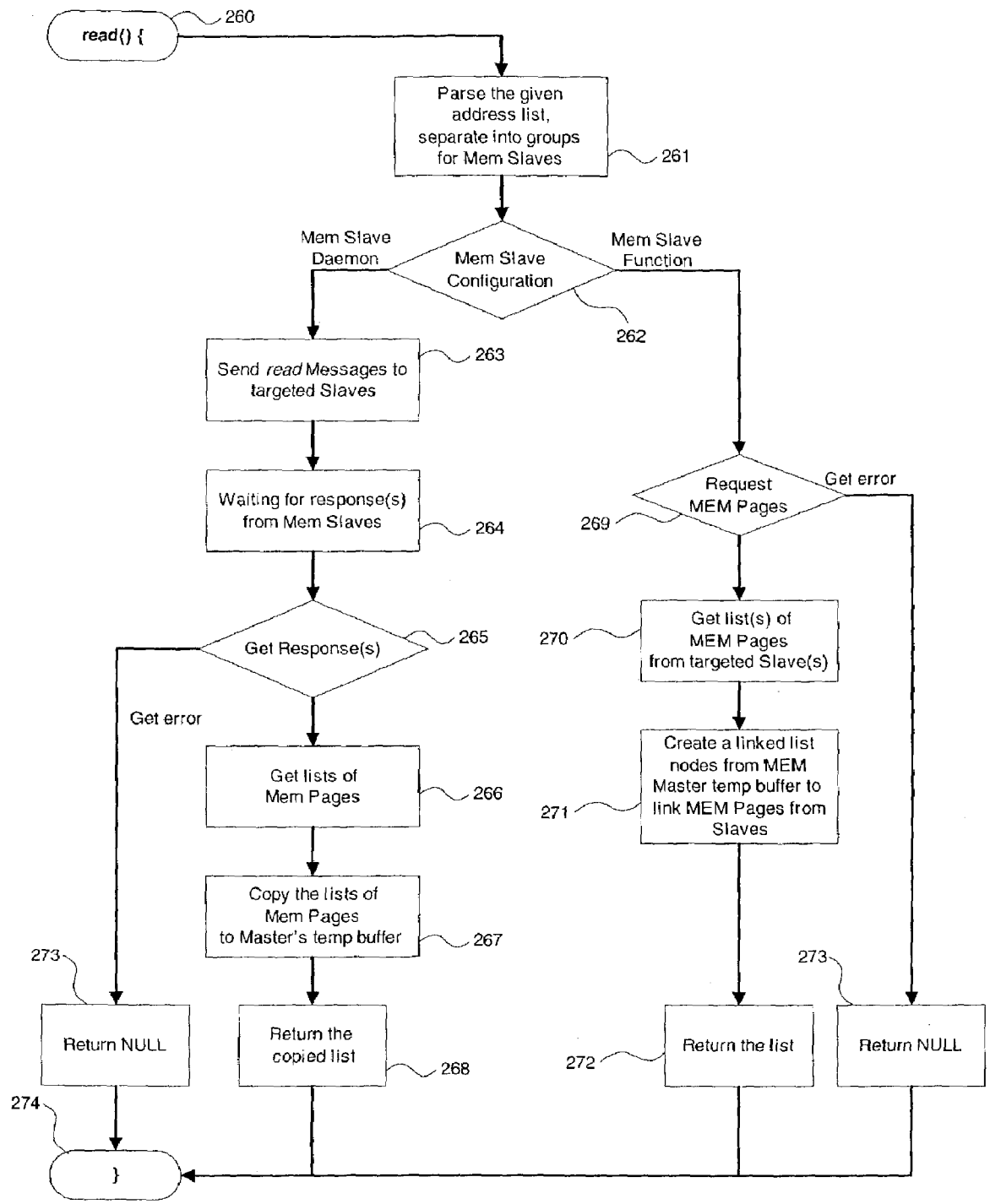
FIG. 15 illustrates a conceptual data flow block diagram of how a memory read function read( ) reads Memory Pages/Nodes using an MMU in an embodiment of the present invention.

Referring to FIG. 15, which illustrates a dataflow block diagram of "read" function using the present MMU. The following a pseudo code of "read" function:

```
read(pointer to a list of addresses, the number of addresses )
{ 260
    Parse the list of addresses, separate the list into group based on MEM
Block ID (which is also the Memory Slave index); 261
    If Memory Slave is configured as Daemon, 262 then
    {
        For each group of addresses, send "read" request trough
Messaging Channel 153 to each Memory Slave; 263
            Waiting and checking for response from every affected
Memory Slave; 264
            Get the responses from Memory Slaves; 265
            If all responses are error, then
            {
                Return NULL; 273
            }274
            For those positive responses, meaning that the response includes
a list of the corresponding requested MEM Pages/Nodes 266, make a
copy for each of the MEM Pages/Nodes from Memory Master's
temporary buffer 267;
            Return the list of MEM Pages/Nodes from the Memory Master's
temporary buffer; 268
    }
    Request "read" of MEM Pages/Nodes from each Memory Slave 269
        If Memory Slave is configured as Function, then
        {
            get the list addresses of MEM Pages/Nodes 270;
            Build a linked list in which each list node pointing
            to one of MEM
            Pages/Nodes 271;
            Return this list 272;
        }273
}
```

The "write" function, takes a pointer to a list of MEM Pages/Nodes and the number of MEM Pages/Nodes in the list as two parameters, return success or error code when finished.

Figure 16:
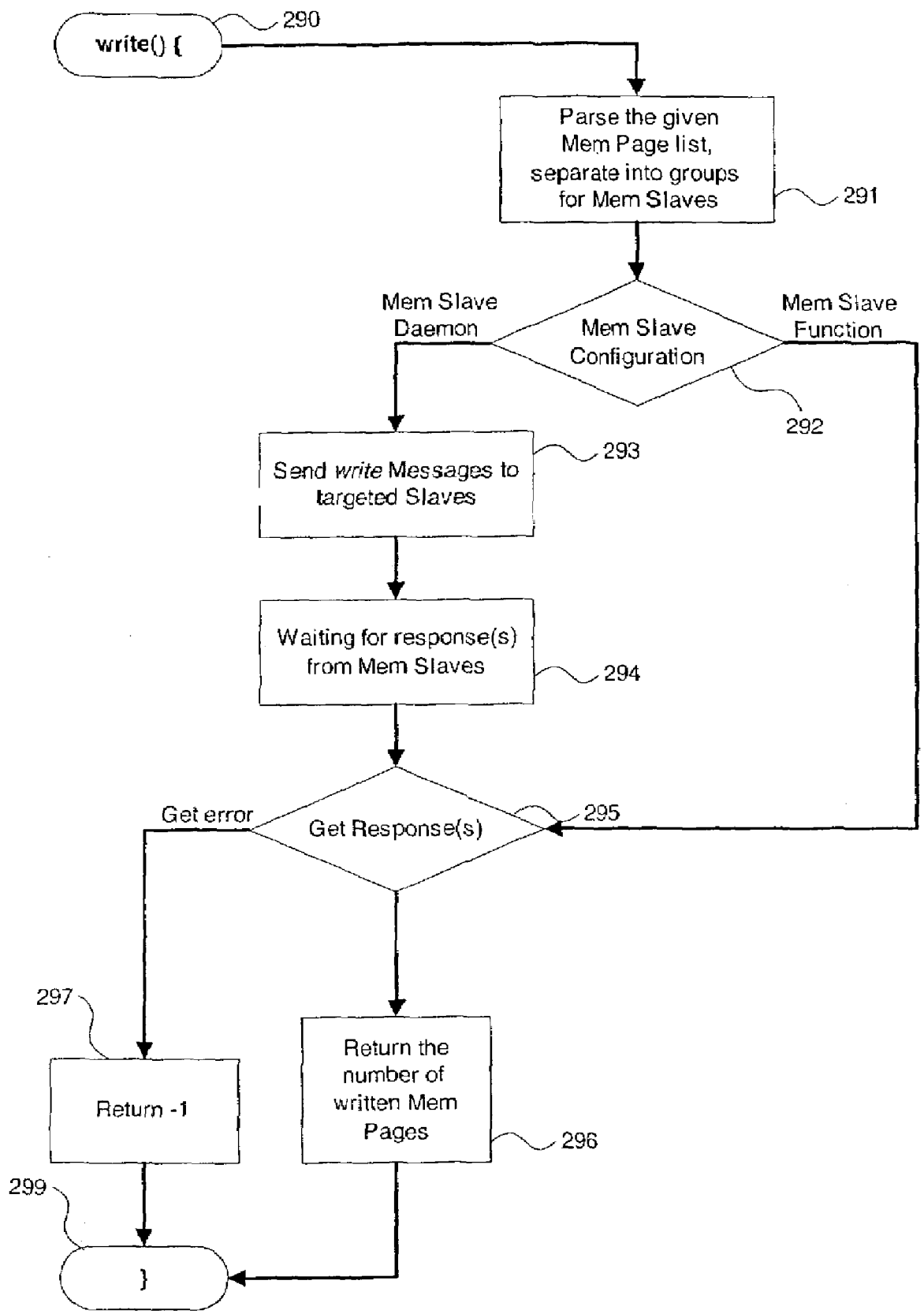
FIG. 16 illustrates a conceptual data flow block diagram of how a memory write function write( ) writes Memory Pages/Nodes using an MMU in an embodiment of the present invention.

Referring to FIG. 16, which illustrates a dataflow block diagram of "write" function using present MMU. The following is a pseudo code for "write" function:

```
write (pointer to a list of MEM Pages/Nodes, the number of
MEM Pages/Nodes) 290
{
Parse the list and separate them into groups based on MEM Block ID that
is embedded in the first 64-bit 291
    {
        If Memory Slave is configured as Daemon, then
        {
            Send MEM Pages to each Memory Slave for writing 293;
            Waiting on returning code for success or fail 294;
            Return -1 if no single Pages are successfully written 297;
            Return the number of successful written Pages 296.
        }299
        If Memory Slave is configured as Function, then
        {
            Waiting on returning code for success or fail 295;
            Return -1 if no single Pages are successfully written 297;
            Return the number of successful written Pages 296.
        }299
    }
}
```

The "free" function takes a pointer to a list of MEM Pages/Nodes, and the number of addresses as parameters, return success or error code when finished.

Figure 17:
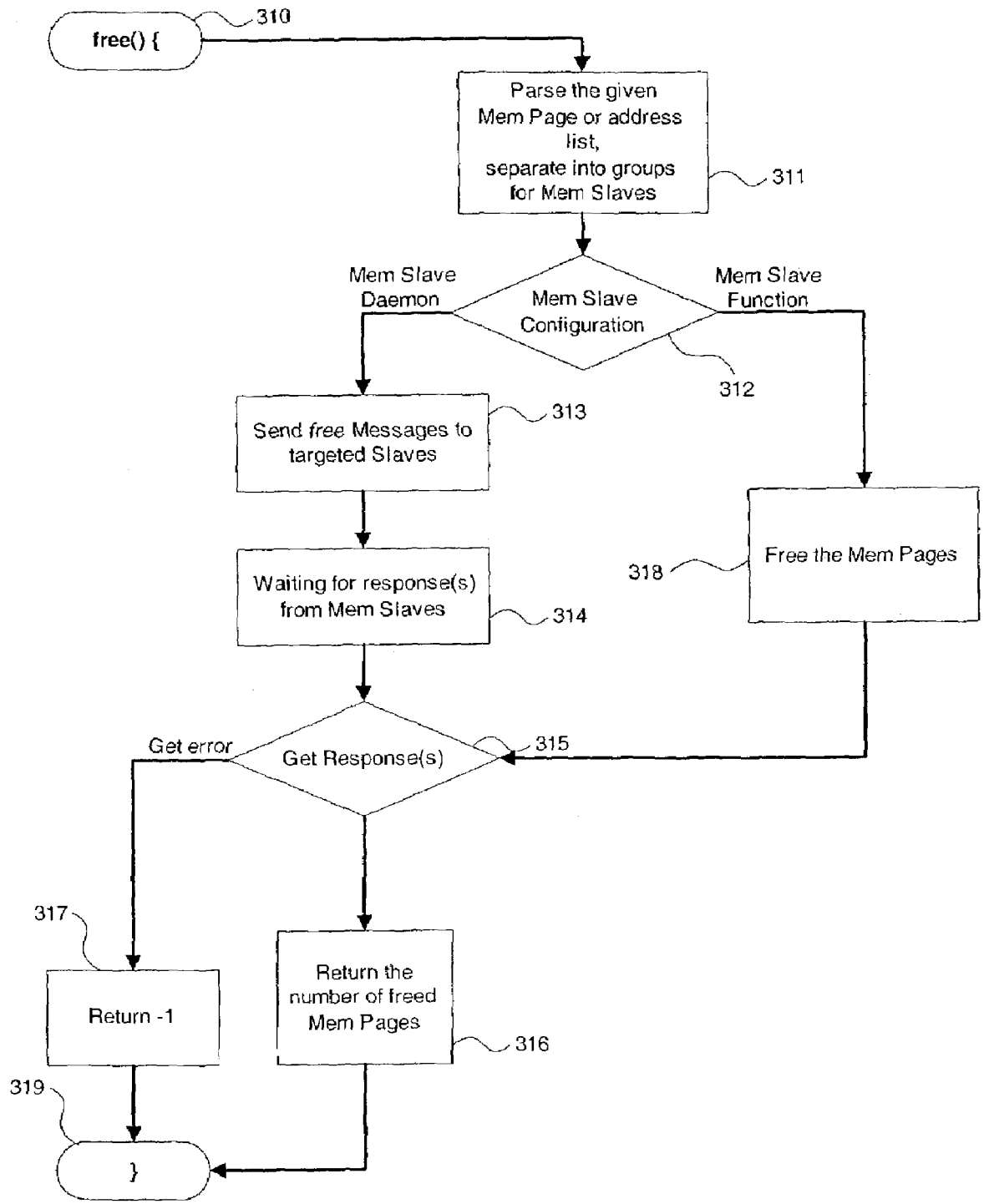
FIG. 17 illustrates a conceptual data flow block diagram of how a memory free function free( ) frees Memory Pages/Nodes using an MMU in an embodiment of the present invention.

Referring to FIG. 17, which illustrates a dataflow block diagram for "free" function using present MMU. The following a pseudo code for "free" function:

```
Free (pointer to a list of MEM Page addresses, the number of addresses in
the list) 310
{
Parse the list and separate them into groups based on MEM Block ID that
is embedded in the first 64-bit 311
    If Memory Slave is configured as Daemon 312, then
    {
        Send MEM Page addresses to each Memory Slave for
        freeing process 313;
        Waiting on returning code for success or fail 314;
        Return –1 if no single Pages are successfully freed 317;
        Return the number of successful freed 316.
    }319
    If Memory Slave is configured as Function 312, then
    {
        Freed the MEM Pages in Memory Slave, i.e., move those
Pages from "Used" to "Unused" 318.
        Waiting on returning code for success or fail 314;
        Return –1 if no single Pages are successfully freed 317;
        Return the number of successful freed 316.
    }319
}
```

Figure 18:
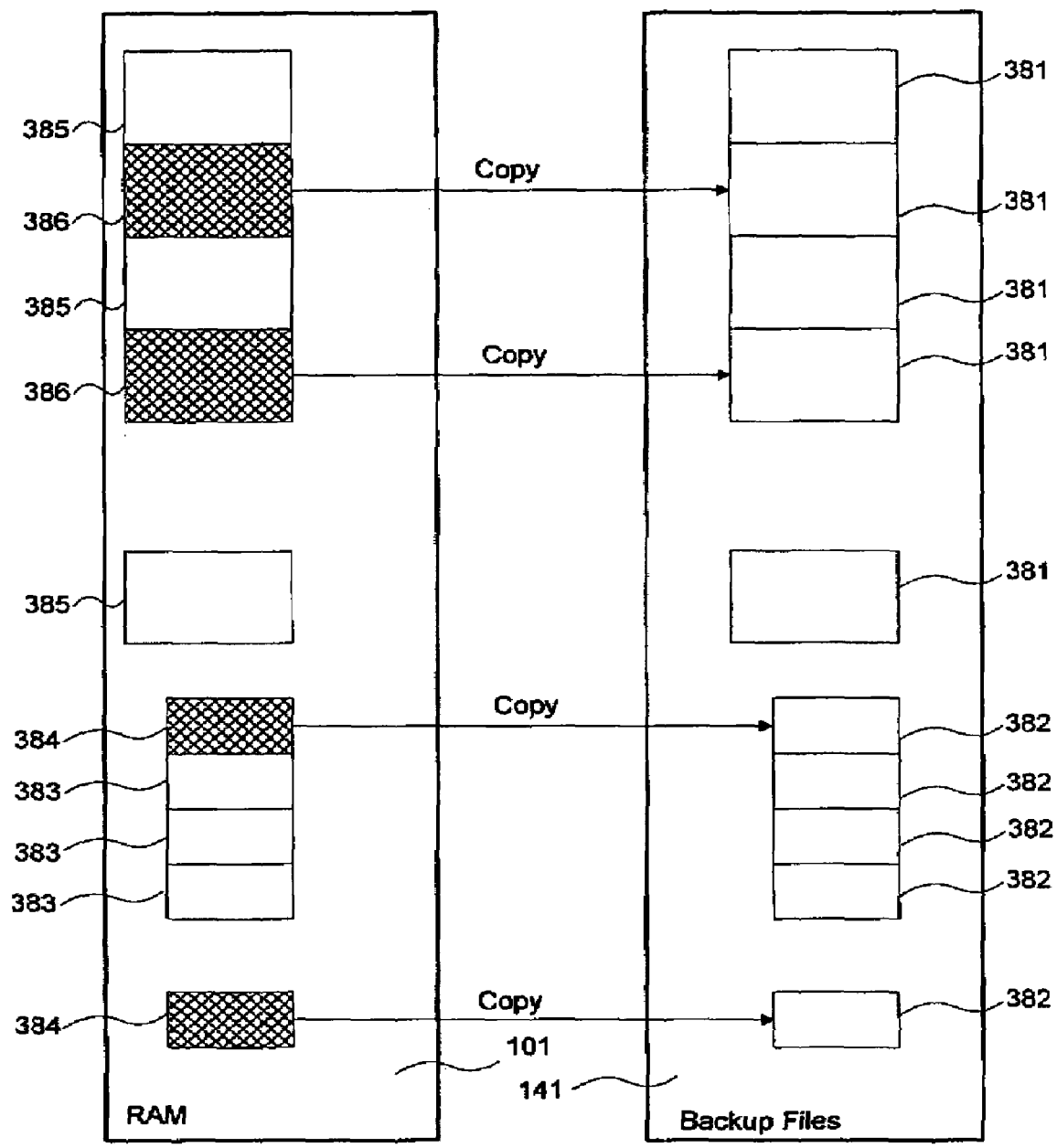
FIG. 18 illustrates a conceptual block diagram of how a Memory Database Backup works in an embodiment of the present invention.

Referring to FIG. 18 illustrates a conceptual block diagram of Memory Backup System to backup Memory Pages and related double-linked-list node blocks as they are the basic components in the Memory Page Pool in the present MMU. The Memory Database Backup system is part of MEM Slave in this embodiment, but it does not have to be. As Memory-Resident Database Management System stores data in memory, and anything stored in current regular RAM (Random Access Memory) 101 will be gone when the power of the server that is hosting the MRDBMS is unplugged, it is necessary and required to have a reliable backup mechanism to prevent losing data in disaster situation.

Still referring to FIG. 18, each memory page is one-to-one copied into files 141 in Memory Backup System. At the running time of MRDBMS, only changed Memory pages 386 need to be copied to its associated file pages 381, the unchanged Memory pages 385 need not to be copied except at its first time. Similarly to Memory nodes, only changed Memory nodes 384 need to be copied to its associated file nodes 382, and the unchanged Memory nodes 383 need not to be copied except its first time. Doubled-linked-list node blocks are normally not changed at the running time, they need to be copied once. As we have disclosed in above FIG. 7, FIG. 8, the ITC Virtual Address has three parts as MEM Server ID, MEM Block ID, and MEM Cell ID, in which MEM Server ID and MEM Block ID are using indexes to a lookup table, MEM Cell ID using offset to memory address, therefore, the ITC Virtual Address is hardware independent, switching a server becomes easy in case of necessary system backup and recovery.

In order to take full advantage of memory based data query, by default all search algorithms for query (including SQL query, but not limited to) will assume that any database table columns that are related to possible queries from users are indexed. Such indexing for database table columns can be configured at the starting time of MRDBMS.

How database table columns are indexed using B+tree or Hash table or any other fast search mechanism is configurable at the starting time of Database Engine.

Figure 19:
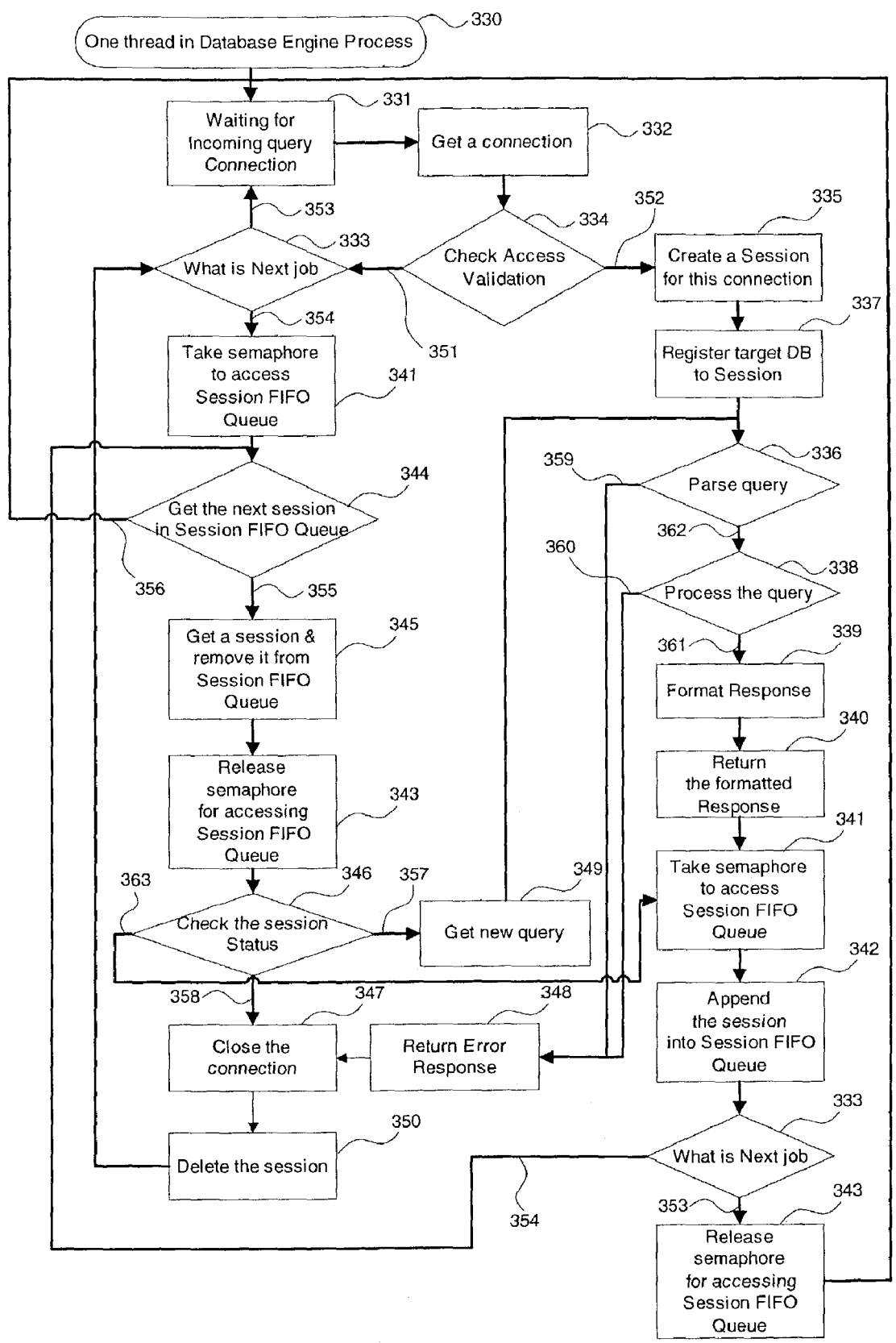
FIG. 19 illustrates a conceptual data flow block diagram of how Database Engine in an embodiment of the present invention works.

Referring to FIG. 19, which illustrates a dataflow block diagram of Database Engine on how to handle user queries 330. Such Engine supports standard SQL queries (Database Query Engine) and also system management queries (System Management Engine) as illustrated in FIG. 2. Additionally, logic 333 is provided to schedule 354 for processing previous connections stored in Session Queue or to wait 353 on possible incoming query connections. Still additionally, logic 334 is provided to check system-level access control, if OK 352, proceed further, if not OK 351, disconnect the connection go next step. Still additionally logic 344 checks whether any previous connection sessions are in the Session Queue, if none 356, then go for waiting for possible incoming connection 331, if there exist 355, then 345 get the session and remove the session from the Queue to prevent other thread from processing it. After get a session from Session Queue, the thread will first 346 check the connection status of the session, whether 358 it is closed by client or is in error status or client is idle over the predefined timeout interval, or whether 357 it is in a status indicating a new query, or whether 363 it is in a status that client is idle. Logic 336 is provided to parse the incoming query and check the semantic syntax, if 362 parse without error then go on for processing 338, if 359 parse with error, return error response 348. After successfully parsing the query, logic 338 is provided to process the query. If processing successfully 361, response is going to be formatted 339 to be returned 340 to client, and take a semaphore 341 to access Session FIFO Queue and append the current session into the Session FIFO Queue 342 for possible next query. If processing with error, return error response 348, close the connection 347 and delete the connection session 350.

What is claimed is:

1. A method for configuring a memory-resident database comprising the steps of:
    creating and managing a memory pool;
    building a data memory structure using a relative memory address;
    creating a database object in memory;
    importing data from an external database into said database object based on a set of configuration parameters;
    repeating said creating a database object and importing data steps for substantially all data in said external database;
    indexing, sorting, and categorizing all imported data during the importing process;
    executing substantially all queries directly from memory;
    backing up data, data objects and data memory structure to one of other memory or nonvolatile storage; and
    restoring backed-up data, data objects and data memory structure from said one of other memory or said nonvolatile storage.

2. A method for configuring a memory-resident database according to claim 1 wherein said set of configuration parameters comprises at least one of data types, data sizes, indexing, and memory page size.

3. A method for configuring a memory-resident database according to claim 1 wherein said external database is not a said memory-resident database and the speed of said restoring a said memory-resident database is substantially faster than that of said importing from a said external database.

* * * * *